(12) United States Patent
Junk

(10) Patent No.: US 12,479,285 B2
(45) Date of Patent: Nov. 25, 2025

(54) PORTAL AXLE ARRANGEMENT AND MOTOR VEHICLE

(71) Applicant: ZF Friedrichshafen AG, Friedrichshafen (DE)

(72) Inventor: Alfred Junk, Passau (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 866 days.

(21) Appl. No.: 17/704,110

(22) Filed: Mar. 25, 2022

(65) Prior Publication Data
US 2022/0305902 A1 Sep. 29, 2022

(30) Foreign Application Priority Data
Mar. 26, 2021 (DE) .................. 102021202987.6

(51) Int. Cl.
*B60K 7/00* (2006.01)
*B60G 9/02* (2006.01)
*B60K 17/04* (2006.01)
*B60K 17/22* (2006.01)

(52) U.S. Cl.
CPC ............ *B60K 7/0007* (2013.01); *B60G 9/022* (2013.01); *B60K 17/043* (2013.01); *B60K 17/22* (2013.01); *B60G 2200/314* (2013.01); *B60G 2200/341* (2013.01); *B60G 2202/152* (2013.01); *B60G 2300/50* (2013.01); *B60K 2007/0046* (2013.01); *B60K 2007/0061* (2013.01); *B60K 2007/0076* (2013.01)

(58) Field of Classification Search
CPC .... B60K 7/0007; B60K 17/043; B60K 17/22; B60K 2007/0046; B60K 2007/0061; B60K 2007/0076; B60K 17/165; B60G 9/022; B60G 2200/314; B60G 2200/341; B60G 2202/152; B60G 2300/50; B60G 2202/1524; B60G 9/00; B60G 1/02; B60B 35/163; B60B 35/006; B60B 35/122
USPC .......................................... 180/253
See application file for complete search history.

(56) References Cited

U.S. PATENT DOCUMENTS

| | | | | |
|---|---|---|---|---|
| 5,433,287 | A | * | 7/1995 | Szalai .................. B60K 17/16 280/124.156 |
| 2003/0137121 | A1 | | 7/2003 | Lenz et al. |
| 2013/0328281 | A1 | * | 12/2013 | Lenz .................... B60G 11/28 280/124.1 |

(Continued)

FOREIGN PATENT DOCUMENTS

| DE | 10028278 A1 | 12/2001 |
|---|---|---|
| DE | 102004003631 A1 | 8/2005 |

(Continued)

OTHER PUBLICATIONS

German Search Report DE 10 2021 202 987.6, dated Nov. 23, 2021. (12 pages).

*Primary Examiner* — Valentin Neacsu
(74) *Attorney, Agent, or Firm* — Dority & Manning, P.A.

(57) ABSTRACT

A portal axle arrangement 1 for a motor vehicle includes at least one portal housing 2 and at least one suspension arm 5, 6. The at least one portal housing 2 includes a receiving section 7 for a portal gear and at least one connecting section 8, 9 for the at least one suspension arm 5, 6, in which the at least one connecting section 8, 9 is designed as a support section. A motor vehicle including such a portal axle arrangement is also provided.

11 Claims, 3 Drawing Sheets

(56) References Cited

U.S. PATENT DOCUMENTS

2022/0305902 A1* 9/2022 Junk ..................... B60G 9/022

FOREIGN PATENT DOCUMENTS

DE    102004003632 A1    8/2005
DE    102016223374 A1    5/2018

* cited by examiner

PORTAL AXLE ARRANGEMENT AND MOTOR VEHICLE

CROSS-REFERENCE TO RELATED APPLICATION

The present application is related and has right of priority to German Patent Application No. 102021202987.6 filed in the German Patent Office on Mar. 26, 2021, which is incorporated by reference in its entirety for all purposes.

FIELD OF THE INVENTION

The invention relates generally to a portal axle arrangement for a motor vehicle, the portal axle arrangement including at least one portal housing and at least one suspension arm, the at least one portal housing including a receiving section for a portal gear and at least one connecting section for the at least one suspension arm. The invention also relates generally to a motor vehicle.

BACKGROUND

Document DE 100 28 278 A1 relates to a portal axle known for motor vehicles, in particular busses, including a housing, in which a differential is arranged, which is connected to two axle shafts, and including a suspension for connecting the housing to the vehicle, which includes one-piece or multi-piece suspension arms, which are mounted, on the one hand, at the housing and, on the other hand, at the vehicle via suspension and/or damping elements. In order to design the suspension arms and/or the suspension arm halves for the portal axles of, in particular, busses, in such a way that, on the one hand, a weight reduction is achieved and, on the other hand, a manufacturing cost reduction is enabled, document DE 100 28 278 A1 provides that the suspension arms are made of corelessly, completely cast metal.

Document DE 10 2004 003 632 A1 relates to a portal drive for a portal axle of a vehicle. In order to enable a large axle offset in combination with a ratio that is as large as possible and small installation space, document DE 10 2004 003 632 A1 provides that a spur gear drive establishes an axle offset between an input gear and an output gear of the spur gear drive, wherein the input gear of the spur gear drive is an internally and externally toothed ring gear, wherein at least one toothing is designed as helical gearing, in the case of which the axial loads are supported via thrust collars.

SUMMARY OF THE INVENTION

Example aspects of the invention structurally and/or functionally improve a portal axle arrangement mentioned at the outset. Example aspects of the invention also structurally and/or functionally improve a motor vehicle mentioned at the outset.

The portal axle arrangement can be utilized for representing a portal axle. The portal axle arrangement can include modules and/or components of a portal axle. The portal axle arrangement can be supplementable with further modules and/or components in addition to a portal axle. The portal axle can be utilized for increasing a ground clearance of the motor vehicle or lowering a passenger compartment floor of the motor vehicle.

The portal axle arrangement can include a differential gear. The portal axle arrangement can include at least one axle shaft. The portal axle arrangement can include a first axle shaft and a second axle shaft. The portal axle arrangement can include an electric drive. The portal axle arrangement can include at least one portal gear. The portal axle arrangement can include a first portal gear and a second portal gear. The portal axle arrangement can include a first portal housing and a second portal housing. The portal axle arrangement can include at least one wheel carrier for a vehicle wheel. The portal axle arrangement can include at least one first wheel carrier and at least one second wheel carrier. The portal axle arrangement can form an axle bridge. The axle bridge can extend between the first portal housing and the second portal housing. The axle bridge can extend at least approximately in a vehicle transverse direction. The first axle shaft and the second axle shaft can be arranged in the axle bridge. The differential gear can be arranged in the axle bridge between the axle shafts.

The at least one portal gear can be designed as an offset gear. The at least one portal gear can include, spaced apart from one another, an input axle associated with one axle shaft and an output axle associated with a wheel carrier. The at least one portal gear can be designed as a spur gear drive, a countershaft transmission, and/or a planetary transmission. The at least one axle shaft can be utilized for mechanically transmitting power between the differential gear and the at least one portal gear. The at least one portal gear can be effective between the at least one axle shaft and the at least one wheel carrier. The receiving section can be utilized for accommodating the at least one portal gear. The at least one portal gear can be arranged in the receiving section.

The at least one suspension arm can be utilized for connecting the portal axle arrangement to a motor vehicle, in particular to a vehicle body. The at least one suspension arm can be utilized as support for a suspension/damping device. The portal axle arrangement can include a first suspension arm, a second suspension arm, a third suspension arm, and a fourth suspension arm. The first suspension arm and the second suspension arm can be associated with the first portal housing. The third suspension arm and the fourth suspension arm can be associated with the second portal housing.

The at least one connecting section can be utilized for connecting the at least one portal housing to the at least one suspension arm. The at least one portal housing can include a first connecting section for one suspension arm and a second connecting section for one further suspension arm. The at least one connecting section can have one free end. The at least one connecting section can extend starting from the receiving section. The at least one connecting section can extend at least approximately in a vehicle longitudinal direction. The at least one connecting section can have a longitudinal axis. The at least one connecting section can have a greater extension in the extension direction of the longitudinal axis of the at least one connecting section than in a transverse direction and in a vertical direction. The at least one connecting section can be narrow and slender in relation to the length of the at least one connecting section. The at least one connecting section can be structurally associated with the portal housing and functionally form a section of the suspension arm.

The at least one connecting section can have a curvature. The at least one connecting section can initially extend at least approximately straight and have a curvature in the further extension in the direction of the free end of the at least one connecting section.

The at least one suspension arm can be utilized for supporting a spring force. The spring force can be directed along a spring axis. The at least one connecting section and the at least one suspension arm can be connected to each other in a plane that is at least approximately parallel to a direction of spring force. A connection between the at least one connecting section and the at least one suspension arm can be arranged at the free end of the at least one connecting section.

The portal housing can have a homogenized transition between the receiving section and the at least one connecting section. A homogenized transition is, in particular, a transition that enables a uniform distribution of power flow and/or avoids concentrations of stress.

The at least one connecting section and the at least one suspension arm can be connected to each other in a force-locking and/or form-locking manner. The at least one connecting section and the at least one suspension arm can be connected to each other in order to transmit transversal loads. The at least one connecting section and the at least one suspension arm can be connected to each other in order to transmit bending forces. The at least one connecting section and the at least one suspension arm can be connected to each other with the aid of a fit. The fit can have at least one abutting surface in the direction of the transversal load. The at least one connecting section and the at least one suspension arm can be connected to each other with the aid of bolts.

The portal housing can be manufactured in a casting process. The portal housing can have a cavity. The cavity can be utilized for accommodating the at least one portal gear. The cavity can extend starting from the receiving section into the at least one connecting section. The cavity can be manufactured with the aid of a casting core.

The at least one suspension arm can be designed as a profile. The profile can have an I-shaped or rectangular cross-section. The at least one suspension arm can be made of a lightweight construction material. The at least one suspension arm can be made of a light metal, such as an aluminum alloy, and/or a fiber-plastic composite, in particular of a carbon fiber-reinforced plastic. The at least one suspension arm can be manufactured in a casting process. The at least one suspension arm can have been manufactured in an autoclave process, a spraying process, a pressing process, a filament winding process, a laminating process, and/or an injection process.

The portal axle arrangement can include two portal housings and four suspension arms, of which at least two suspension arms are manufactured as identical components. The portal axle arrangement can include two portal housings and four suspension arms manufactured as identical components. The first suspension arm and the third suspension arm can be manufactured as identical components. The second suspension arm and the fourth suspension arm can be manufactured as identical components. The first suspension arm, the second suspension arm, the third suspension arm, and the fourth suspension arm can be manufactured as identical components.

The motor vehicle can be a vehicle having increased ground clearance. The motor vehicle can be a vehicle having a lowered passenger compartment floor. The motor vehicle can be a low-profile vehicle. The motor vehicle can be a passenger car, a truck, a commercial vehicle, a tractor, or a bus. The motor vehicle can be an electric vehicle or a hybrid electric vehicle. The motor vehicle can include at least one portal axle. The at least one portal axle can be formed with the aid of the portal axle arrangement. The motor vehicle can have a vehicle longitudinal axis, a vehicle transverse axis, and a vehicle vertical axis. The motor vehicle can have a vehicle body. The at least one suspension arm can connect the portal axle arrangement to the vehicle body. A suspension/damping device can be arranged between the vehicle body and the at least one suspension arm. The one suspension/damping device can rest, on the one hand, against the vehicle body and, on the other hand, against the at least one suspension arm, in particular against the free end of the suspension arm. The suspension/damping device can include at least one spring having a spring axis and/or at least one damper having a damper axis. The at least one spring can be a pneumatic spring. The spring axis and/or the damper axis can extend at least approximately in the vehicle vertical direction.

In summary and expressed in other words, example aspects of the invention therefore yields, among other things, a portal axle. A bolted connection of a suspension arm with a portal housing can be shifted into a non-critical area. A transition between the suspension arm and the portal housing can be configured to be homogenized. The suspension arm can be designed to be symmetrical for use in all positions. A bolt connection surface can be arranged centrally in a plane of symmetry. The suspension arm can be made of aluminum or a carbon fiber-reinforced plastic material. A transversal load transmission can take place via mating surfaces at a bolt connection surface. The suspension arm can have any type of cross-sectional shape, for example, an I-profile, a rectangular cross-section, etc.

With example aspects of the invention, a load at a connection between the portal housing and the suspension arm is reduced. A torsional load of the connection can be reduced or avoided. A loading of structural elements is reduced. Structural elements can be designed to be smaller and lighter. Outlay, such as materials used, manufacturing complexity, assembly work, complexity of logistics, and/or costs, is reduced. An installation space requirement is reduced.

BRIEF DESCRIPTION OF THE DRAWINGS

In the following, exemplary embodiments of the invention are described in greater detail with reference to figures. Diagrammatically and by way of example.

DETAILED DESCRIPTION

Figure 1:
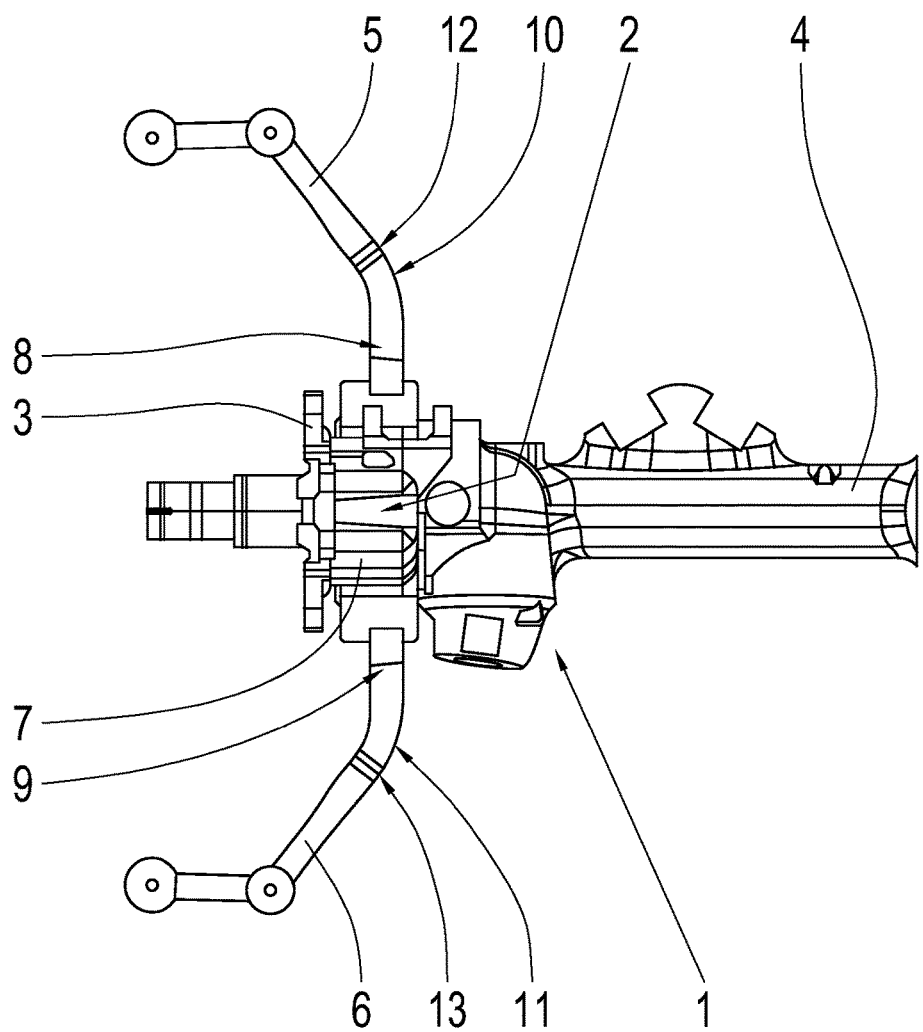
FIG. 1 shows a portal axle arrangement including a portal housing and two suspension arms in a top view according to an example embodiment.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Figure 2:
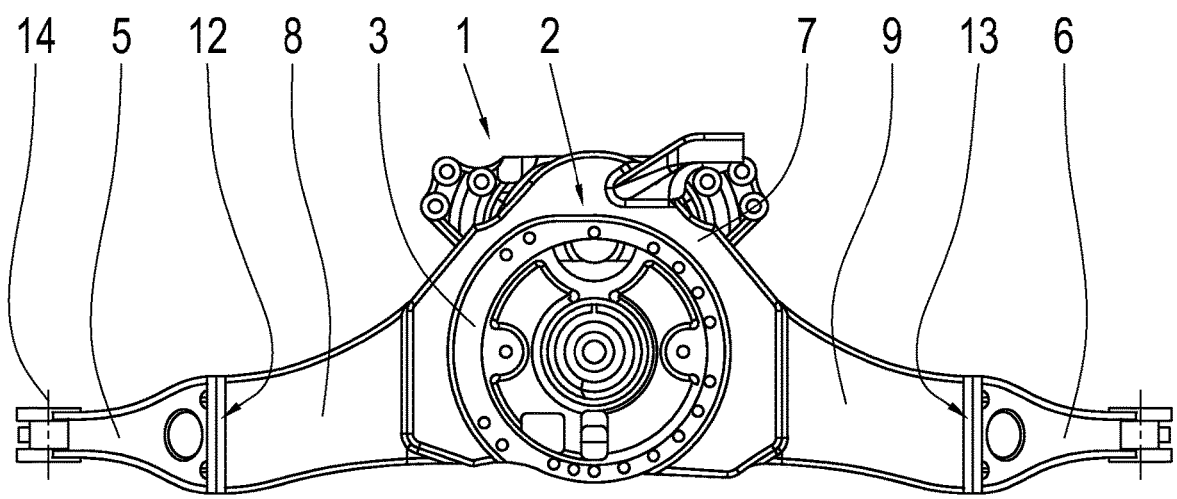
FIG. 2 shows a portal axle arrangement including a portal housing and two suspension arms in a side view according to an example embodiment.

FIG. 1 shows a portal axle arrangement 1 including a portal housing 2, a wheel carrier 3, an axle bridge 4, and two suspension arms 5, 6 in a top view. FIG. 2 shows the portal axle arrangement 1 in a side view. The portal axle arrangement 1 forms a portion of a portal axle of a low-profile vehicle.

The portal housing 2 has a receiving section 7 for a portal gear and two connecting sections 8, 9, which are designed as support sections, for the suspension arms 5, 6. The connecting sections 8, 9 each initially extend, starting from the receiving section 7, straight in the vehicle longitudinal direction and, in the further extension, have a curvature 10, 11 and a free end 12, 13, respectively. The portal housing 2 has a homogenized transition between the receiving section 7 and the connecting sections 8, 9, which enables a uniform distribution of power flow and avoids concentrations of stress.

The suspension arms 5, 6 are utilized for connecting the portal axle arrangement 1 to a vehicle body and as support for a suspension/damping device having a spring force direction 14 and are manufactured as identical components. The connecting sections 8, 9 and the suspension arms 5, 6 are connected to each other, respectively, in a plane that is parallel to the spring force direction 14. The connections between the connecting sections 8, 9 and the suspension arms 5, 6 are arranged at the free ends 12, 13 of the connecting sections 8, 9. The connecting sections 8, 9 are structurally associated with the portal housing 2 and functionally form sections of the suspension arms 5, 6.

Figure 3:
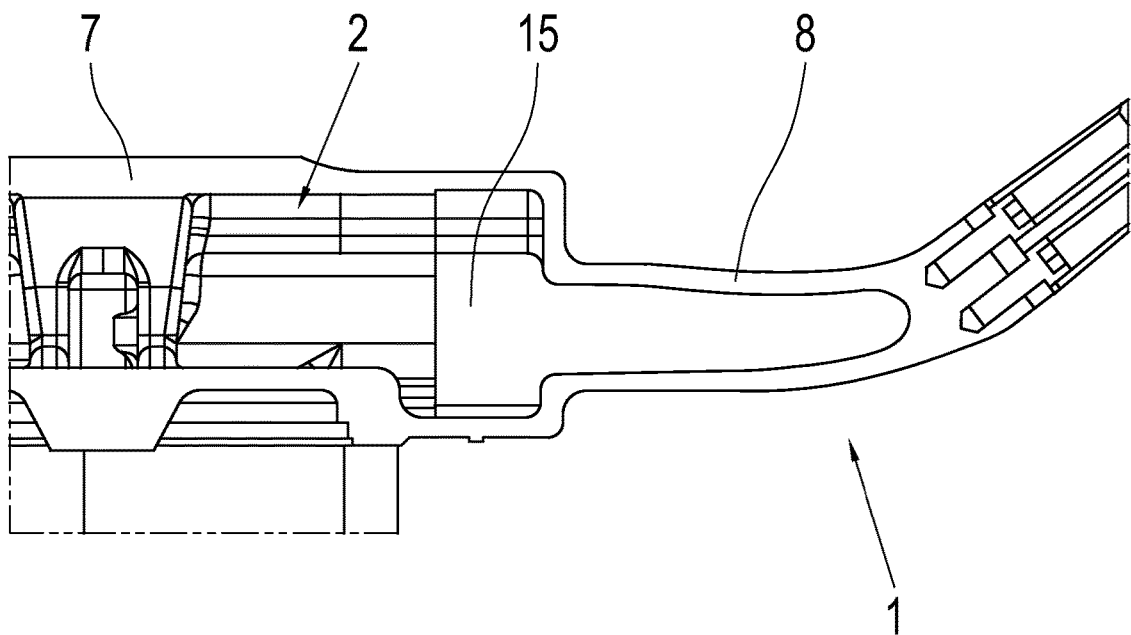
FIG. 3 shows a portal housing of a portal axle arrangement in a sectional view according to an example embodiment.

FIG. 3 shows a portal housing 2 of a portal axle arrangement 1 in a sectional view. The portal housing 2 is manufactured in a casting process and has a cavity 15 for accommodating the one portal gear. The cavity 15 extends, starting from the receiving section 7, into the connecting section 8 and is manufactured with the aid of a casting core. For the rest, reference is additionally made, in particular, to FIG. 1 and FIG. 2 and the associated description.

Figure 4:
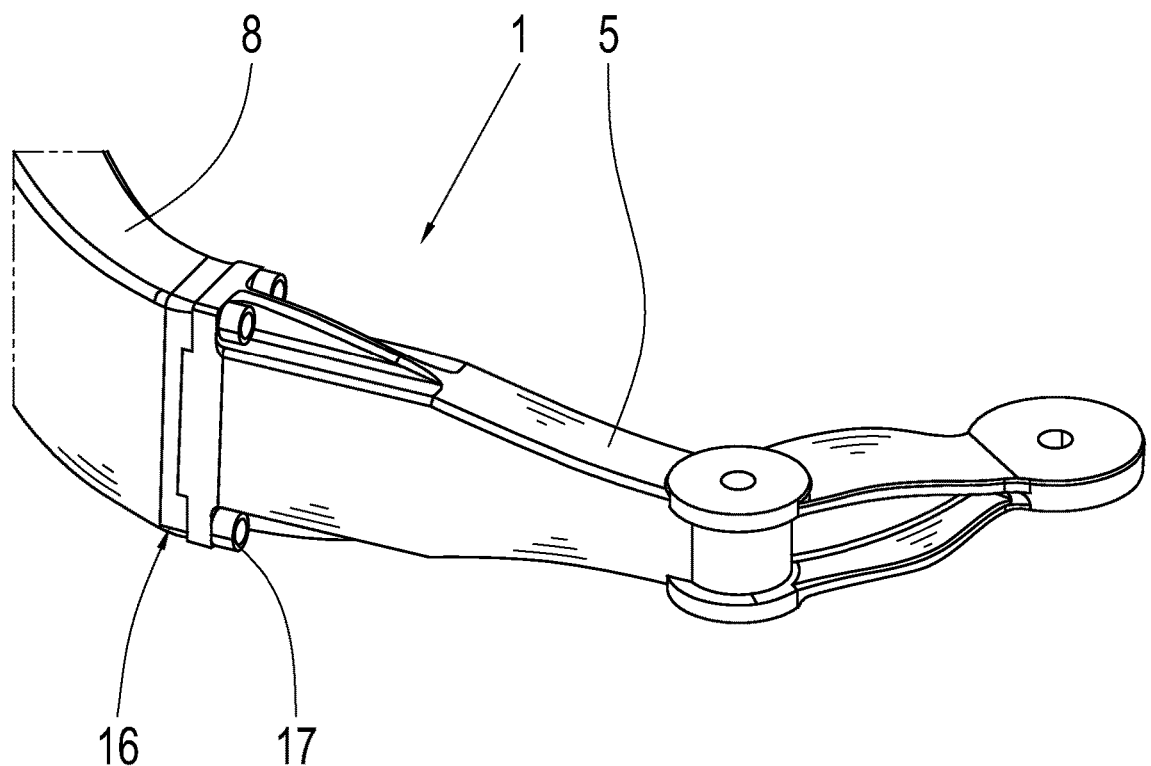
FIG. 4 shows connection between a connecting section of a portal housing and a suspension arm of a portal axle arrangement according to an example embodiment.

FIG. 4 shows a connection between a connecting section 8 of a portal housing and a suspension arm 5 of a portal axle arrangement 1. The connecting section 8 and the suspension arm 5 are connected to each other with the aid of a fit 16 having abutting surfaces in the direction of the transversal load and with the aid of bolts 17. The suspension arm 5 has a rectangular cross-section and reinforcing ribs. For the rest, reference is additionally made, in particular, to FIG. 1 and FIG. 2 and the associated description.

Figure 5:
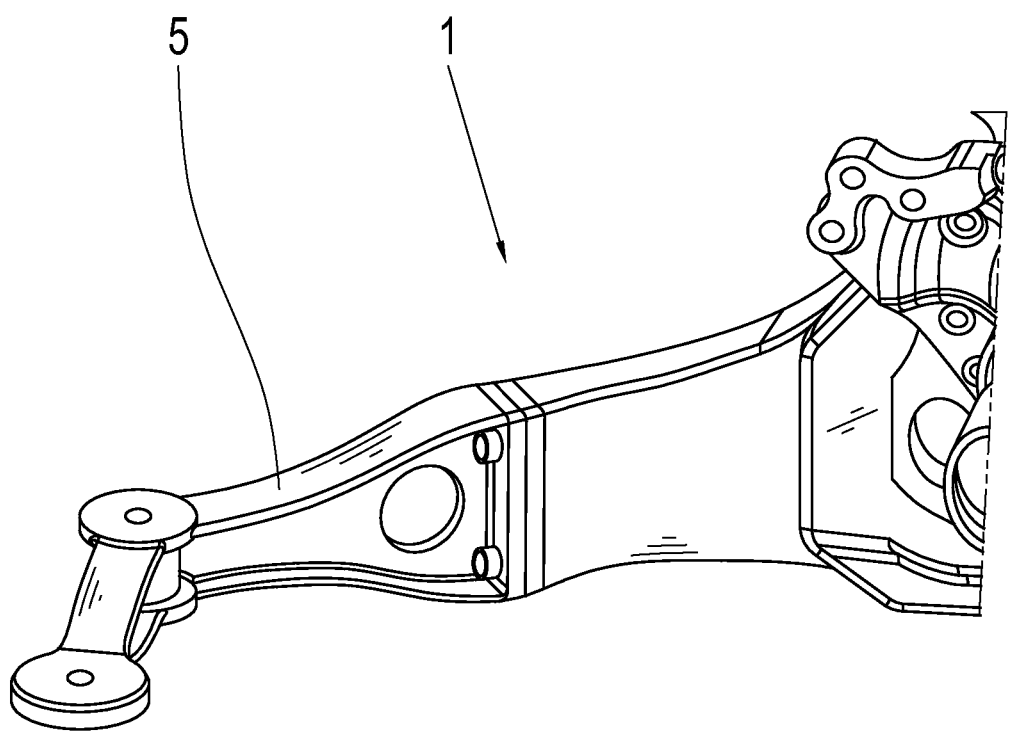
FIG. 5 shows a suspension arm of a portal axle arrangement having an I-shaped cross-section according to an example embodiment.

FIG. 5 shows a suspension arm 5 of a portal axle arrangement 1 with an I-shaped cross-section. For the rest, reference is additionally made, in particular, to FIG. 1 and FIG. 2 and the associated description.

The term "can" refers, in particular, to optional features of the invention. Accordingly, there are also refinements and/or exemplary embodiments of the invention that, additionally or alternatively, have the particular feature or the particular features.

Specific features can also be extracted in isolation from the combinations of features described in the present case, if necessary, and, after resolving a structural and/or functional relationship that may exist between the features, can be used in combination with other features to delimit the subject matter of the claim.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS 1 portal axle arrangement
2 portal housing
3 wheel carrier
4 axle bridge
5 suspension arm
6 suspension arm
7 receiving section
8 connecting section
9 connecting section
10 curvature
11 curvature
12 end
13 end
14 spring force direction
15 cavity
16 fit
17 bolt

The invention claimed is:

1. A portal axle arrangement (1) for a motor vehicle, comprising:
at least one portal housing (2), the at least one portal housing (2) includes a receiving section (7) for a portal gear and at least one connecting section (8, 9) extending from the receiving section (7), the at least one connecting section (8, 9) being configured as a support section; and
at least one suspension arm (5, 6), each of the at least one suspension arm (5, 6) being connectable to a respective one of the at least one connecting section (8, 9) wherein each of the at least one suspension arm (5, 6) is connectable to the respective one of the at least one connecting section (8, 9) by a bolted connection.

2. The portal axle arrangement (1) of claim 1, wherein the at least one connecting section (8, 9) has a curvature (10, 11).

3. The portal axle arrangement (1) of claim 1, wherein the at least one suspension arm (5, 6) is configured for supporting a spring force, and the at least one connecting section (8, 9) and the at least one suspension arm (5, 6) are connected to each other in a plane that is at least approximately parallel to a spring force direction (14) of the spring force.

4. The portal axle arrangement (1) of claim 1, wherein each of the at least one portal housing (2) has a homogenized transition between the receiving section (7) and the at least one connecting section (8, 9).

5. The portal axle arrangement (1) of claim 1, wherein the at least one connecting section (8, 9) and the at least one suspension arm (5, 6) are form-lockingly connected to each other in order to transmit transverse loads.

6. The portal axle arrangement (1) of claim 1, wherein each of the at least one portal housing (2) is a cast housing and includes a cavity (15) that extends, starting from the receiving section (7), into the at least one connecting section (8, 9).

7. The portal axle arrangement (1) of claim 1, wherein the at least one suspension arm (5, 6) has an I-shaped or rectangular cross-section.

8. The portal axle arrangement (1) of claim 1, wherein the at least one suspension arm (5, 6) is made of metal or fiber-plastic composite.

9. The portal axle arrangement (1) of claim 1, wherein:
   the at least one portal housing (2) comprises two portal housings (2);
   the at least one suspension arm (5, 6) comprises four suspension arms (5, 6); and
   the four suspension arms (5, 6) are identically shaped.

10. A motor vehicle, comprising the portal axle arrangement (1) of claim 1.

11. The portal axle arrangement (1) of claim 1, wherein each of the at least one suspension arm (5, 6) extends from the receiving section (7) to a free end (12, 13), each of the at least one suspension arm (5, 6) being connectable to the free end (12, 13) of the respective one of the at least one connecting section (8, 9).

\* \* \* \* \*